Oct. 8, 1940.     H. P. L. LAUSSUCQ     2,217,172

DRAWING PRESS AND PROCESS

Filed June 29, 1935     14 Sheets-Sheet 2

Inventor
Henri P. L. Laussucq.
by Wm Steell Jackson and Son
Attorneys.

Oct. 8, 1940.    H. P. L. LAUSSUCQ    2,217,172
DRAWING PRESS AND PROCESS
Filed June 29, 1935    14 Sheets-Sheet 3
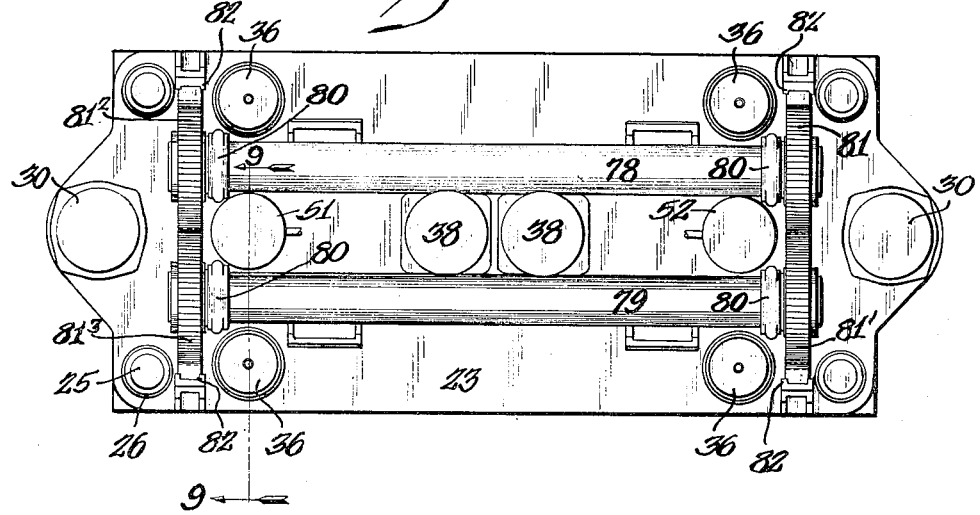
Fig. 3.
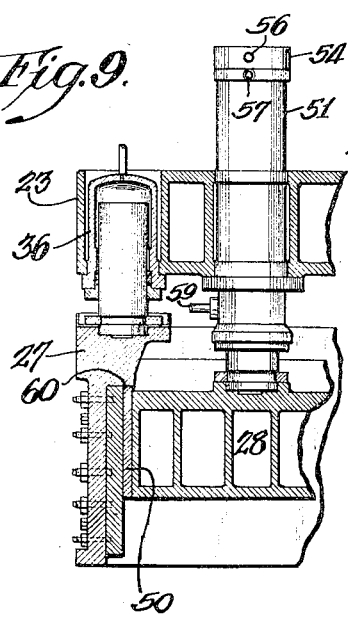
Fig. 9.
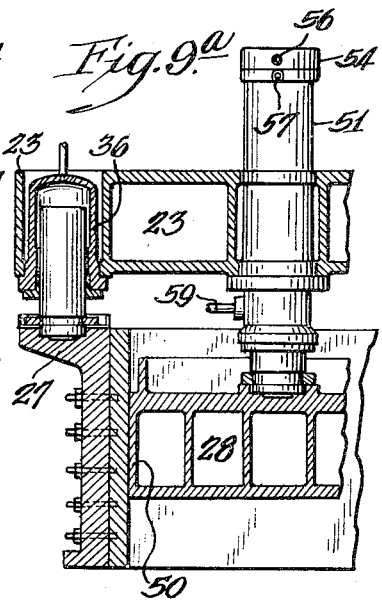
Fig. 9ᵃ.
Inventor:
Henri P. L. Laussucq
by [signature]
Attorneys.

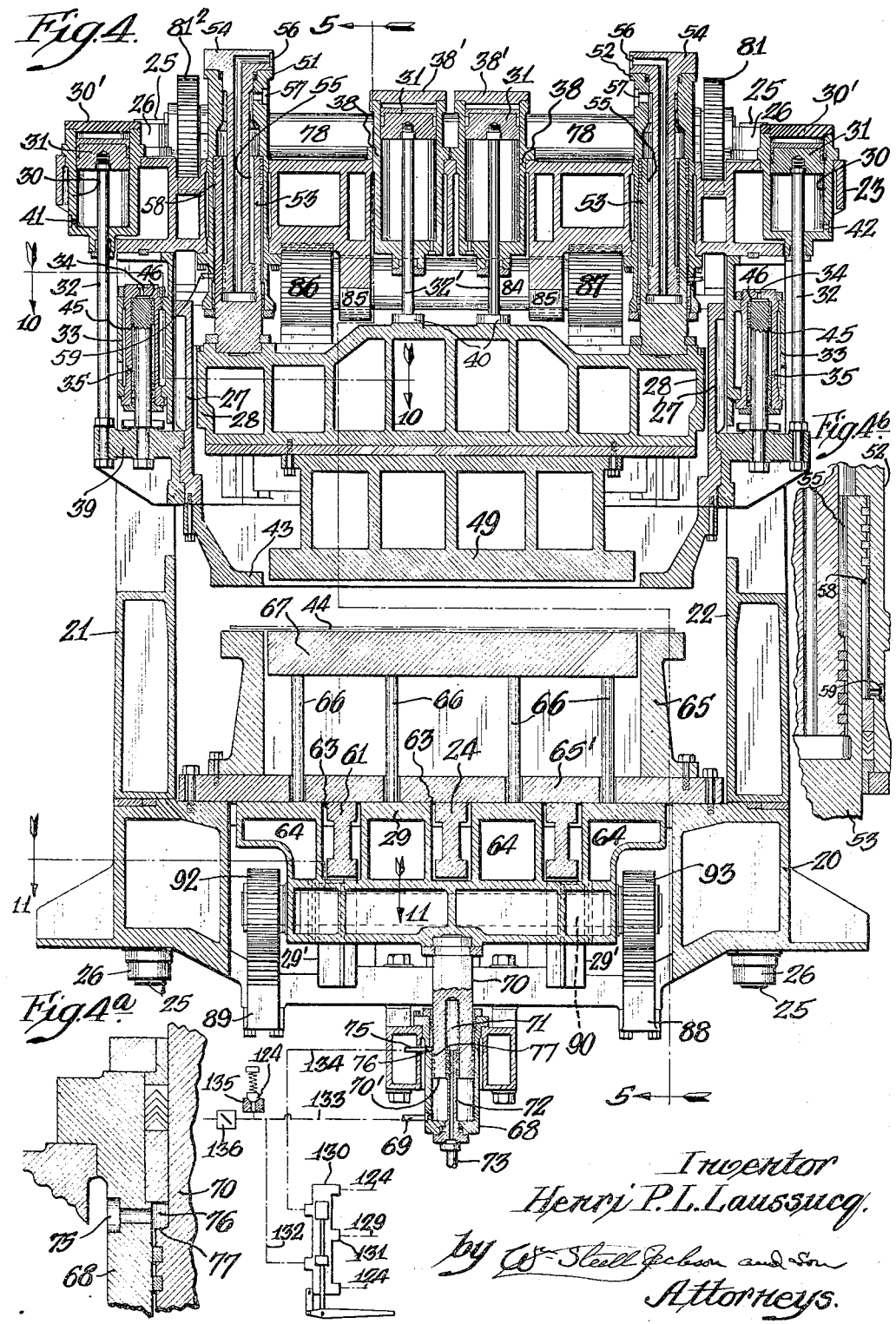

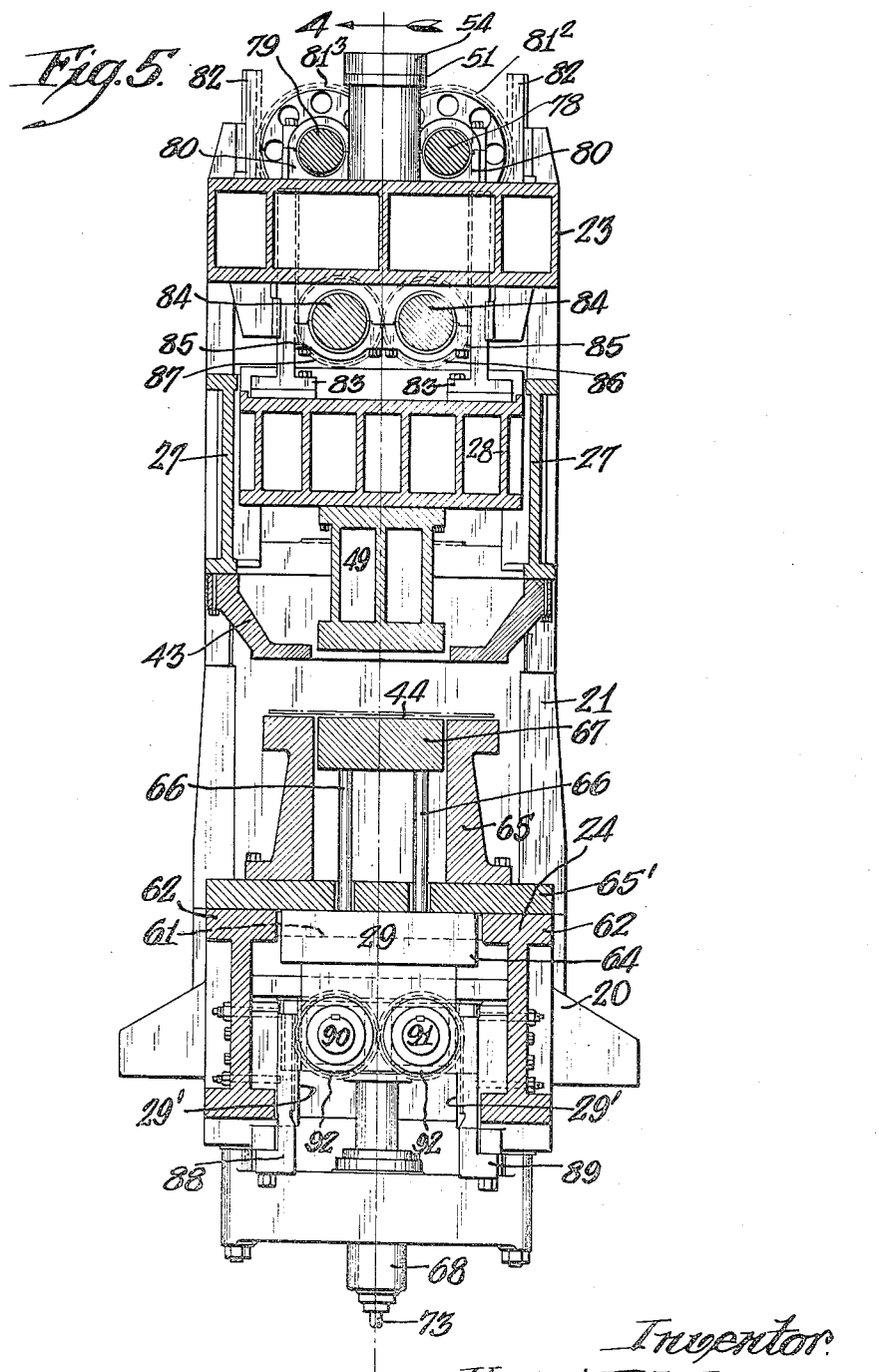

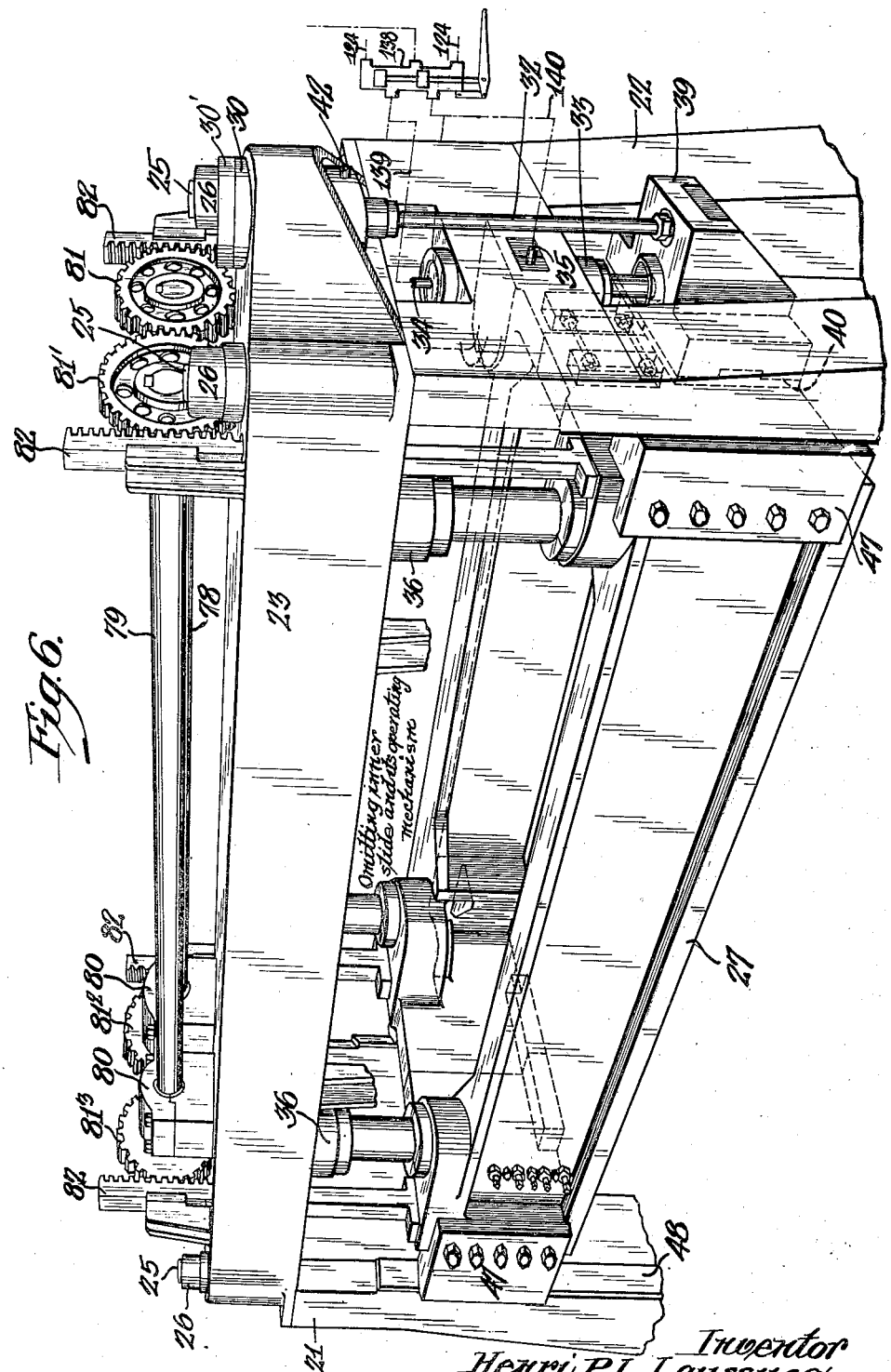

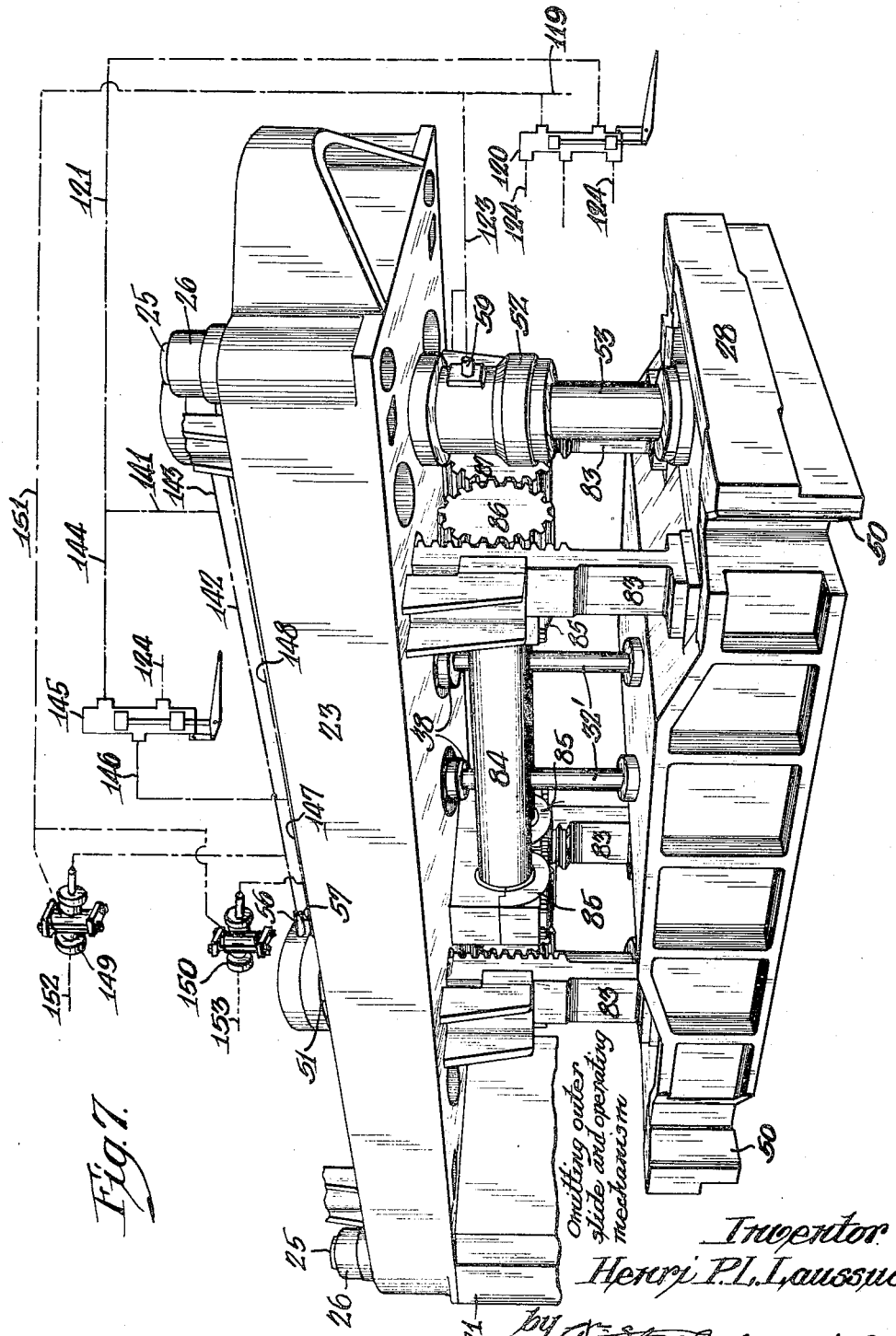

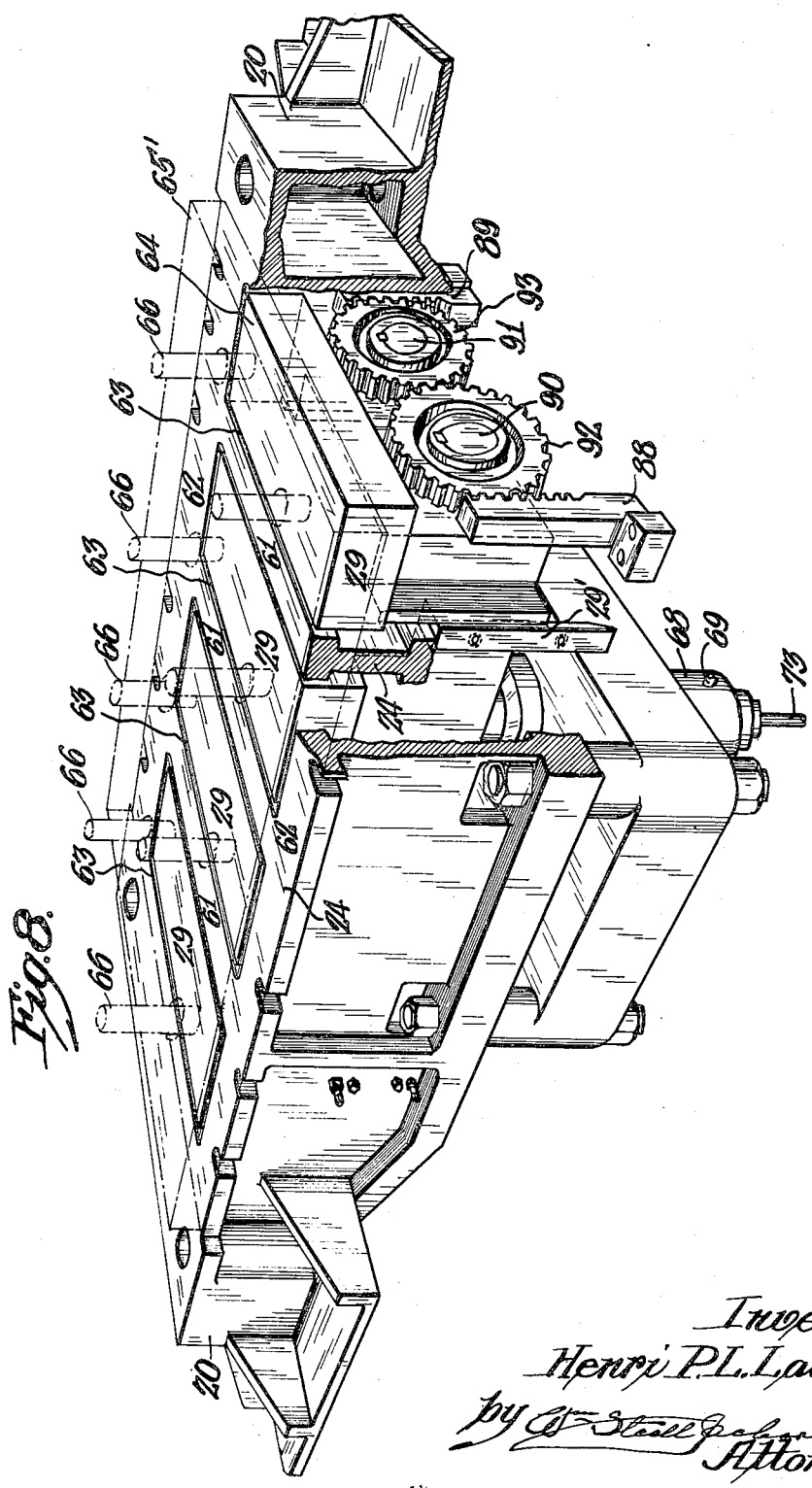

Oct. 8, 1940.   H. P. L. LAUSSUCQ   2,217,172
DRAWING PRESS AND PROCESS
Filed June 29, 1935   14 Sheets-Sheet 14

Inventor.
Henri P. L. Laussucq.
by  Attorneys.

Patented Oct. 8, 1940

2,217,172

UNITED STATES PATENT OFFICE 2,217,172

DRAWING PRESS AND PROCESS

Henri P. L. Laussucq, Reading, Pa., assignor to Birdsboro Steel Foundry and Machine Company, Birdsboro, Pa., a corporation of Pennsylvania Application June 29, 1935, Serial No. 28,990

29 Claims. (Cl. 113—45)

My invention relates to presses of a type intended for drawing operations from sheet or other material which is clamped along the edges or at other selected surfaces so as to permit drawing through the clamp if desired and which is provided with cooperating dies to outline the contour of the final body, vessel or other object drawn.

One of the purposes of the present invention is to provide for selective variations of pressure of the clamping die by which the edges or surfaces of the sheet are held, subject to predetermined selective creeping when a creeping strain upon the work has been reached.

A further purpose is to permit selective progressive variation of the pressure by which the edges or other surfaces of the sheet are held, to provide for selective drawing differently from different edges or directions according to the location of the draw and the depth of draw.

A further purpose is to provide for alteration of the pressure upon the edges during the act of drawing so that the creeping of the edge may be controlled usually to make it more nearly uniform. The pressure may be altered uniformly or variantly throughout the clamping perimeter.

A further purpose is to equalize the motions of a holding clamp at different points about the perimeter of the clamp, or a cushioning die, punch, male die, stripper, or other movable member about its operating perimeter.

A further purpose is to drop a cushion head or auxiliary die rapidly after it has performed its dieing function.

A further purpose is to show that the invention is not dependent upon any individual type of equalizer for the inner slide or for the outer slide, or for the lower movable platen by illustrating two different types of equalizers effective to perform the function.

A further purpose is to provide alternative methods and means for producing variant pressures in individual operating cylinders, different from each other and capable of variation during the progress of the drawing stroke.

A further purpose is to control the pressures in different cylinders effective about the perimeter of a clamp alternatively by the extent of progress of a drawing operation for time or for other desired and selected relation.

A further purpose is alternatively to bring the pressure up quickly to a minimal pressure in each of a number of clamping cylinders and then individually and differently boost the pressure to controlled variant pressures for the start of a drawing stroke or utilize the individual pressure means to bring the pressure up initially in the cylinders as well as to vary these pressures during the stroke.

A further purpose is alternatively to use the outer clamping slide of a clamping and drawing press to control the idle stroke of the inner slide of the press or to separately take care of the two idle strokes, either together or separately, as parts of a sequence of press operations.

A further purpose is to alter the operating pressures of a variable pressure control in proportion to some function controlled by the drawing progress of a drawing die.

A further purpose is to utilize any tendency of a portion of a slide to feed forward faster than the remainder of the slide to transmit power to the remainder of the slide tending to tilt the slide in a direction to correct the improper feed.

A further purpose is to provide a single mechanism and a method capable of great flexibility in application to widely variant work where a drawing operation is to be performed with or without support for the bottom of the section displaced and with or without reentrant lateral displacement in the opposite direction to that of the main draw and within the section of the main draw.

My invention resides not only in the methods or processes disclosed but in mechanism, also, including mechanism by which the methods may be carried out.

I have preferred to illustrate two forms of the invention only among the various forms in which it may be shown, selecting forms which, though practical, effective and well suited to the purposes intended, have nevertheless been selected primarily because of their excellence in illustrating the invention.

Figure 3 is a top plan view of the structure seen in Figures 1 and 2.

Figure 4 is a section upon lines 4—4 of Figure 2.

Figures 4a and 4b are fragmentary sectional views corresponding with parts of Figure 4, but showing the parts in enlarged view.

Figure 5 is a section taken upon line 5—5 of Figure 4.

Figure 6 is a fragmentary perspective view showing the inner slide and the mechanism by which the inner slide is operated. This view omits the structure of the outer slide and its operating mechanism.

Figure 7 is a fragmentary perspective view showing the outer slide and its operating mechanism. This view omits the inner slide and the operating mechanism for the inner slide.

Figure 8 is a fragmentary perspective view of the lower movable platen capable of performing a third operation. It omits the structure with which it cooperates in the performance of these functions.

Figure 10:
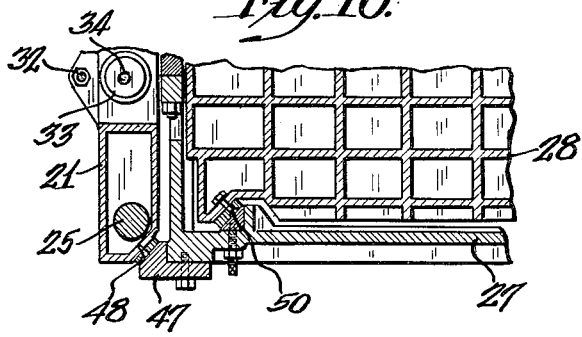
Figure 11:
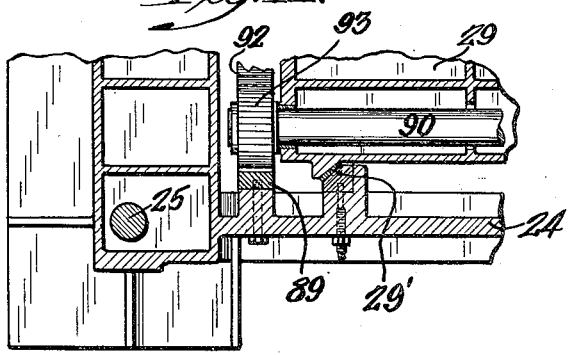

Figures 9, 10 and 11 are all fragmentary sections, taken upon lines 9—9 of Figure 3; 10—10 of Figure 4; and 11—11 of Figure 4.

Figure 9a is a section corresponding to Figure 9 but showing a modification.

Figure 12:
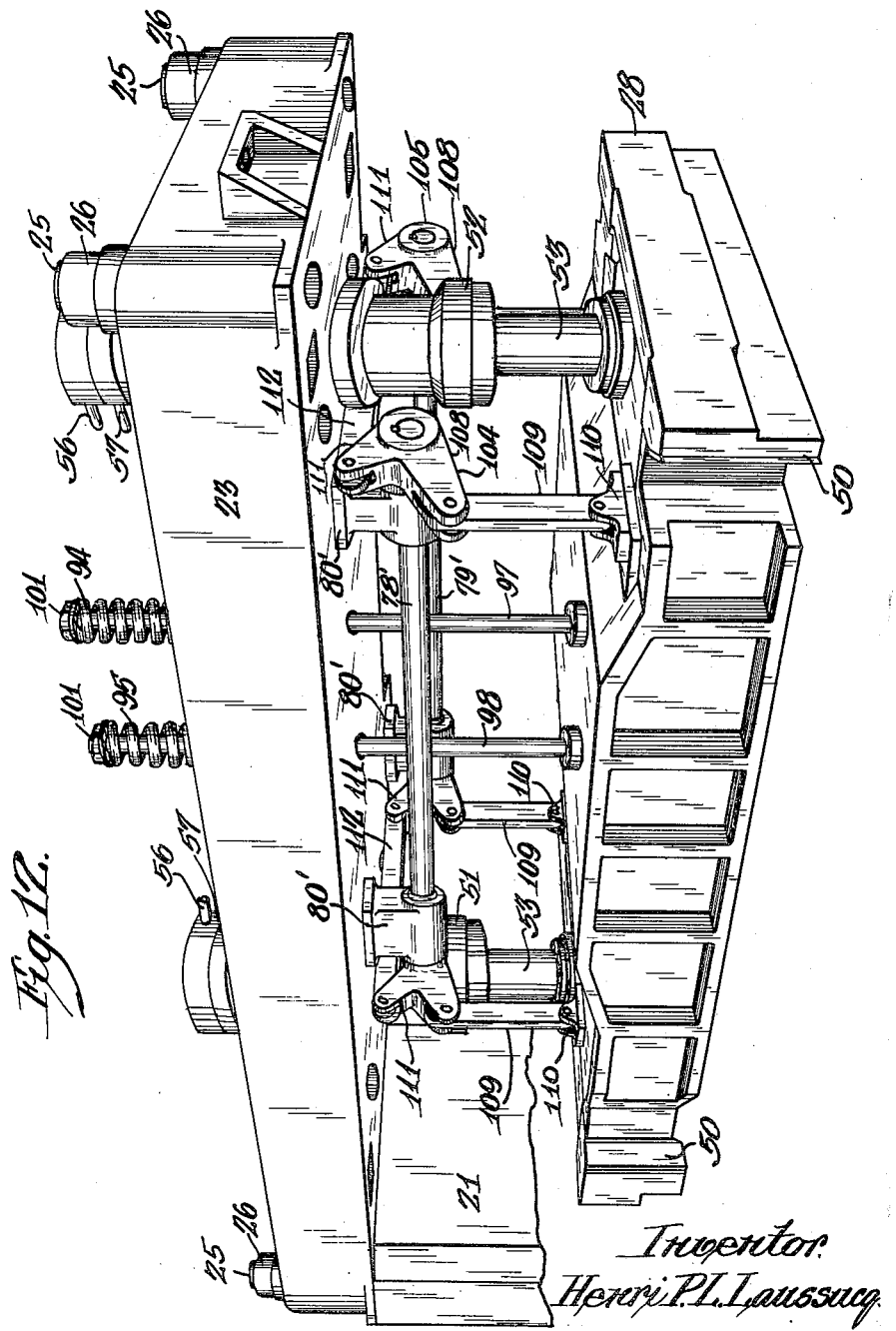

Figure 12 is a fragmentary perspective view illustrating a modified form of the invention and corresponding generally with Figure 6 in that the inner slide and the mechanism by which it is operated are shown and the outer slide and its operating mechanism are omitted.

Figure 13:
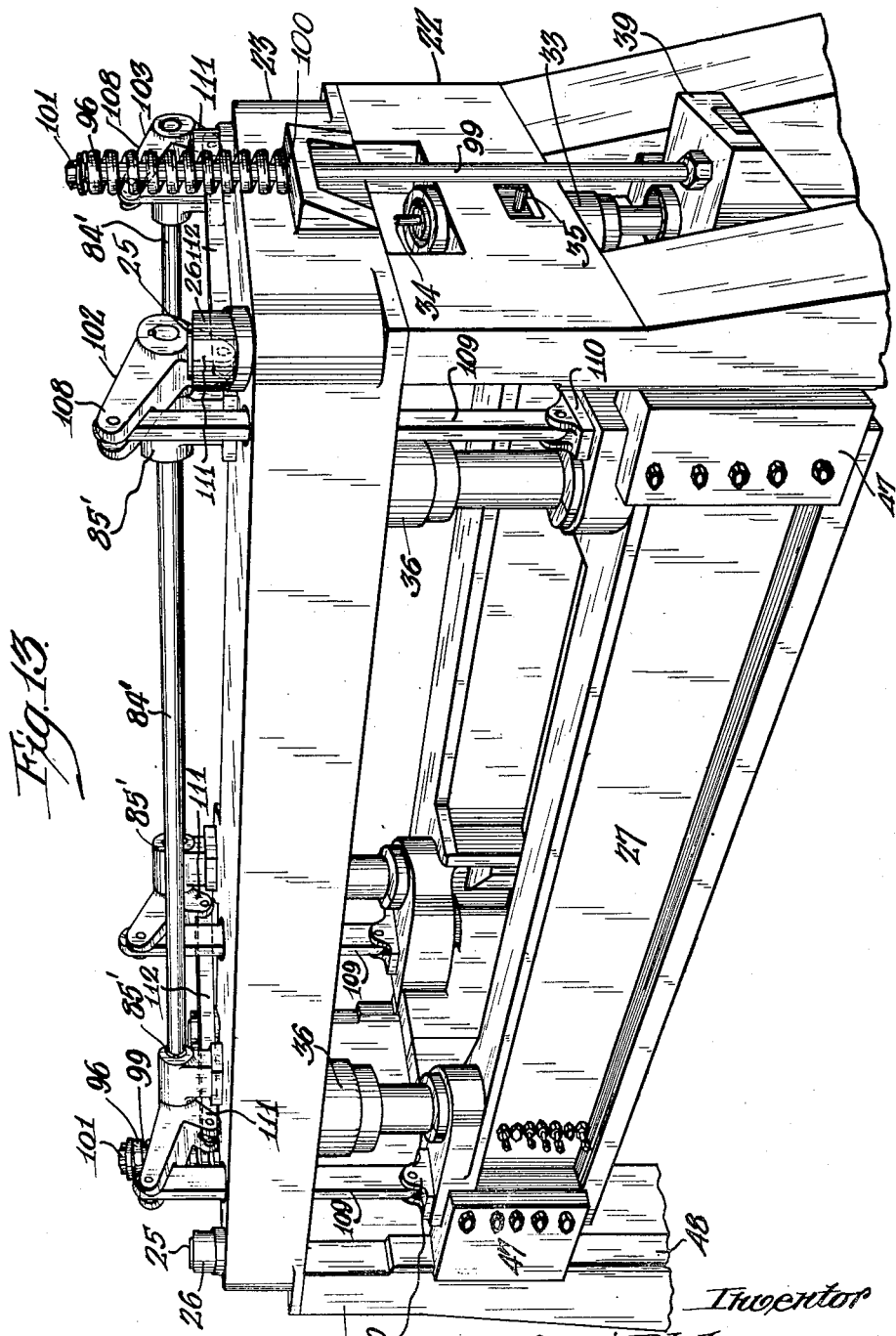

Figure 13 is a fragmentary perspective of a modified form but corresponding generally to Figure 7 in that the outer slide and its operating mechanism are shown and the inner slide and its operating mechanism are omitted.

Figure 14:
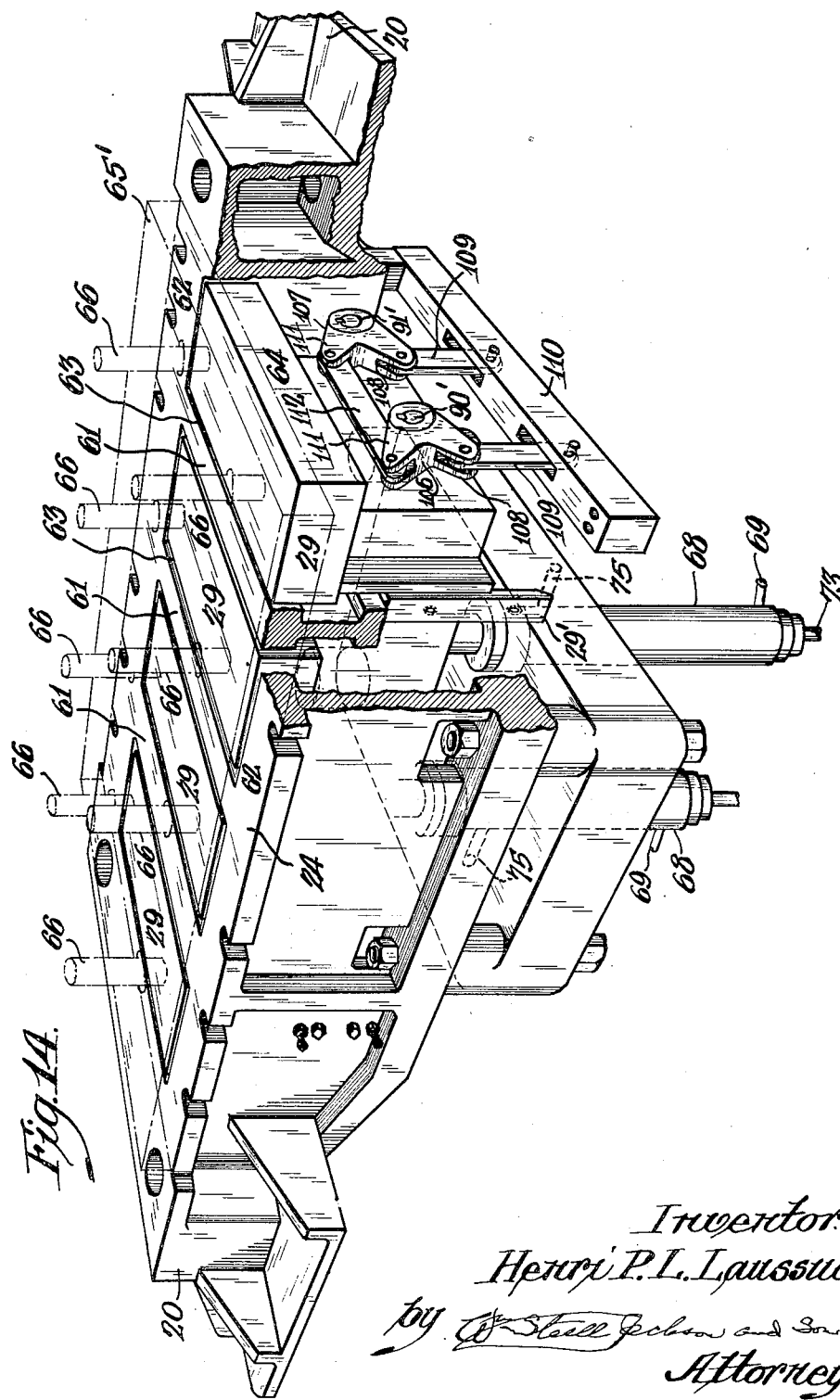

Figure 14 is a fragmentary perspective view showing a modification and corresponding generally to Figure 8 in that it omits the structure with which the lower movable platen cooperates to perform its function.

Figure 15:
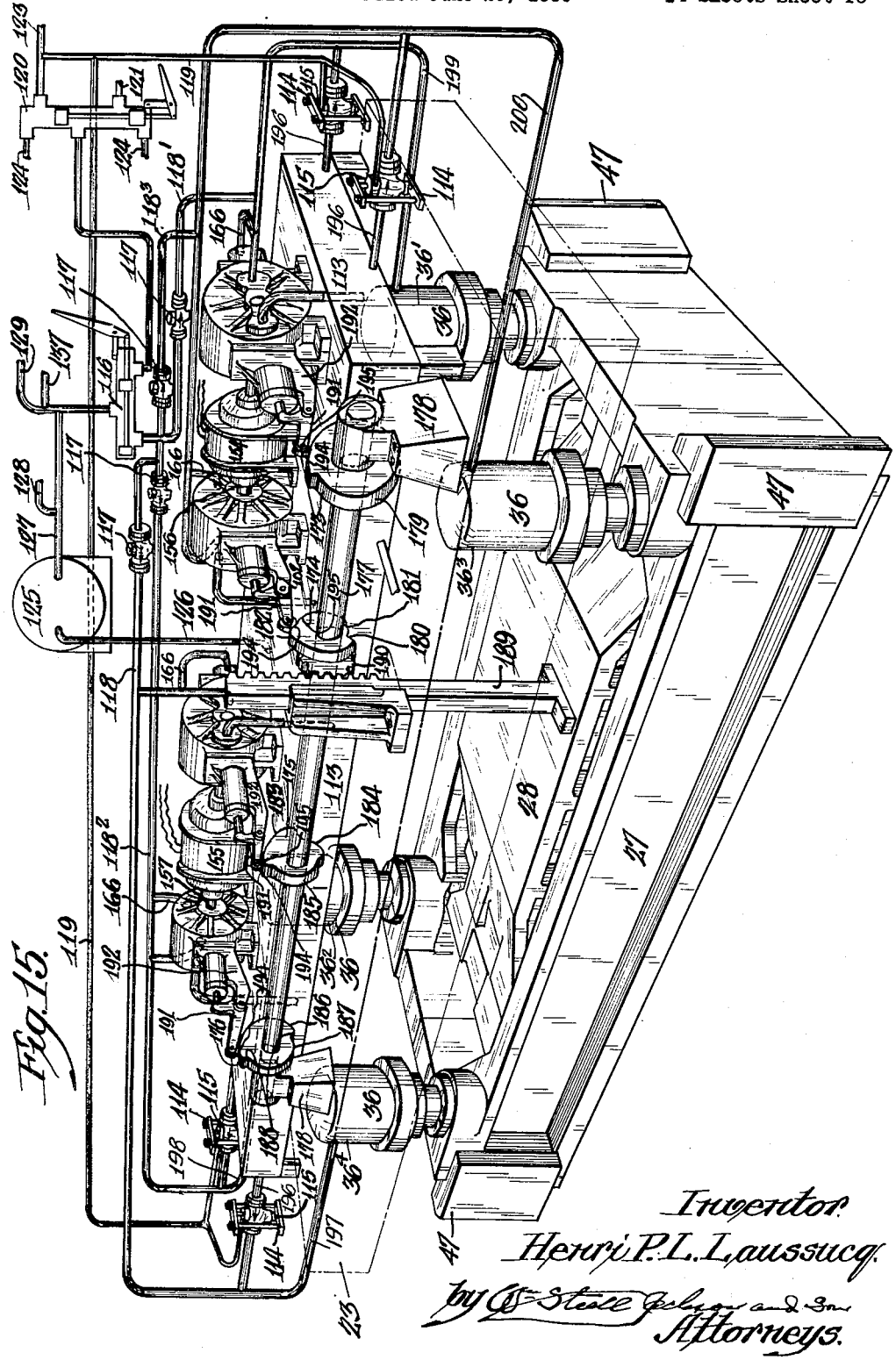

Figure 15 is a fragmentary perspective view largely for the purpose of showing diagrammatic connections and operating mechanism for the structure shown.

Figure 16:
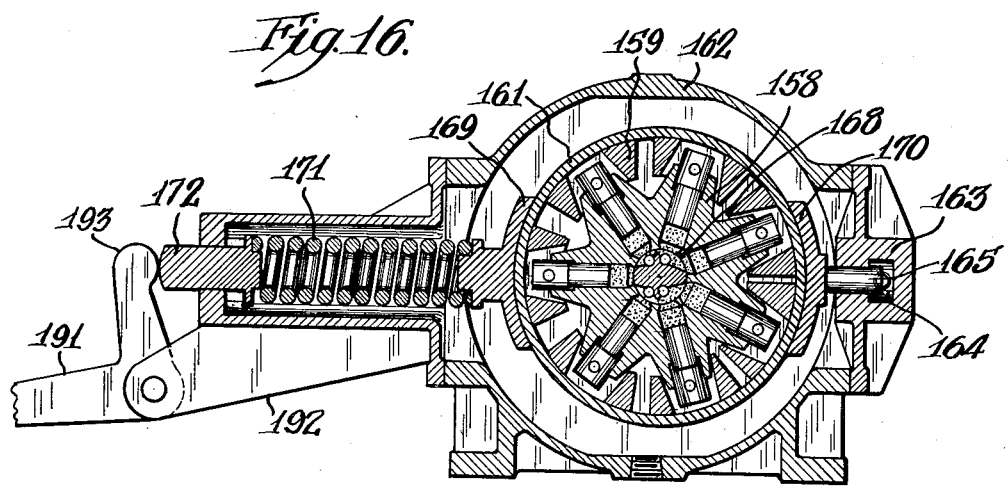

Figure 16 is a section and partial side elevation of a variable pressure pump control used.

Figures 16A, 17:
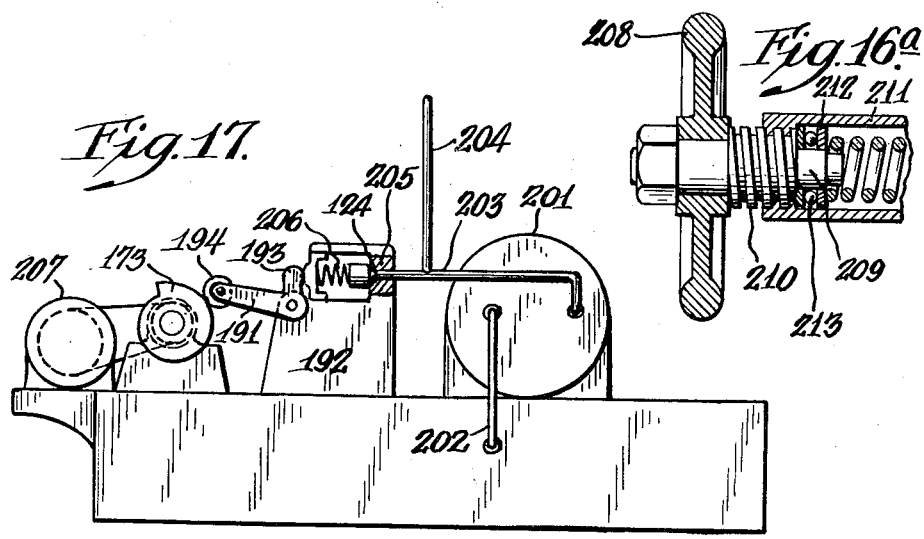

Figure 16a is a modified fragment of Figure 16.

Figure 17 is a side elevation partly broken away, showing a means for securing variant pressure alternative to Figure 16.

In the drawings similar numerals indicate like parts.

The invention includes various parts of a hydraulic press for lateral displacement of metal from a work-sheet, shape or other blank by a drawing process. The press has three movable parts; a clamp slide holding the blank against a fixed draw table; an inner slide whose die effects the drawing; and cushion or third action slide cooperating with the inner slide die.

Not only during the idle strokes of the outer clamp slide, the inner slide and the third action or cushioning slide, but during the drawing operation of such a press, lack of parallelism of successive positions of the faces of the clamp and dies carried by these slides is quite objectionable. During the idle stroke the chief objection is in causing binding of the several slides against their guides. During the operation it is objectionable in the inner slide and third action slide because of the resultant irregularity or unevenness in the drawing.

Attempt has been made to overcome objectionable nonparallelism but the effort has increased the friction against the slide guides. The present invention is directed in part to securing uniformity of movement, that is parallelism of positions of the faces of the dies, during both the idle stroke of the outer slide and the idle and drawing strokes of the inner and third action slides. Applicant has effected this by power-transferring means which is nearly free from the previous objectionable increase in friction.

Notwithstanding that in the main the faces of the guides carried by the slides must be maintained rather closely in parallel positions by what may be regarded as a coarse adjustment in contrast with a very much more refined adjustment of the clamp position, it is desirable that the outer clamping slide shall be canted or/and deflected or bent well within the permissible variation under the coarser adjustment so as to produce variant pressures upon the edges or other clamping surfaces of the work blank in order that the slipping, called creeping, of the blank beneath the clamping die may be controlled. This slipping or creeping takes place notwithstanding high pressure exerted by the clamps (and, as a reaction, by the draw table) against the faces of the blank. The creeping provides material for the draw and the pressure prevents wrinkling or puckering of the material as it creeps through.

Applicant attacks this problem with a correction which is flexible and which automatically "follows through." It is based not upon space or distance but upon pressure and maintenance of a predetermined pressure even if it be necessary to automatically cant the outer slide in order to secure the exact pressure which was contemplated. Of course it must be understood that variation in distance is very slight, usually of the order merely of thousandths of an inch.

Applicant has not alone accommodated initial variations in pressure unaffected by variation in thickness, but has provided methods and mechanism by which the pressure available at selected points about the perimetral clamped surfaces of the blank may be progressively varied up or down—or may be maintained—during the progress of the drawing operation upon each individual blank.

The press illustrated is supported upon a frame comprising a base 20, side housings 21 and 22, upper fixed platen 23 and a fixed lower platen 24 preferably integral with the base. The parts are held together by bolts 25 and nuts 26 at the four corners. The upper fixed platen supports outer and inner slides 27, 28 with their balancing, operating and travel-equalizing mechanism.

The press is designed primarily for drawing operations to produce sheet metal parts from sheets, or even from castings where the metal cast is quite ductile. Ordinarily the sheet will be flat when the operation is begun, but where it is not the contour of the drawing table and of the clamp carried by the outer slide will conform to the surface to be clamped. Likewise the die cushion surface will conform generally to the bottom of the draw. The press will, of course, be capable of other functions than drawing functions, for example, punching functions in which either the die carried by the inner slide or the die carried by the third action head will be the punch and in which event the equalizing and contour distributing functions hereinafter described will be of benefit.

The die cushion or third action head 29 will, of course, perform upwardly pressing functions or stripping functions.

The outer slide

Figure 1:
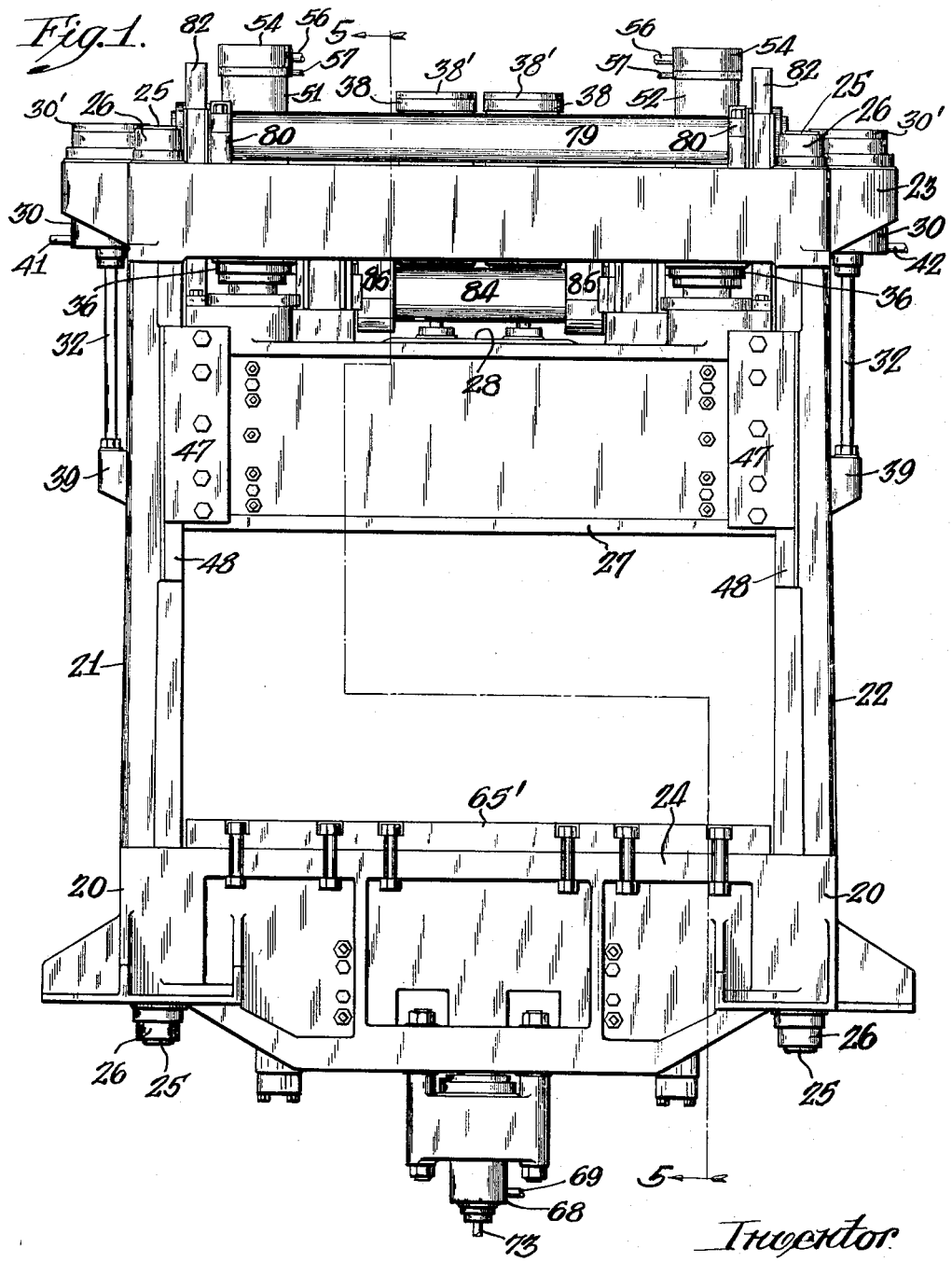
Figure 1 is a front elevation of the preferred embodiment of the invention.
Figure 2:
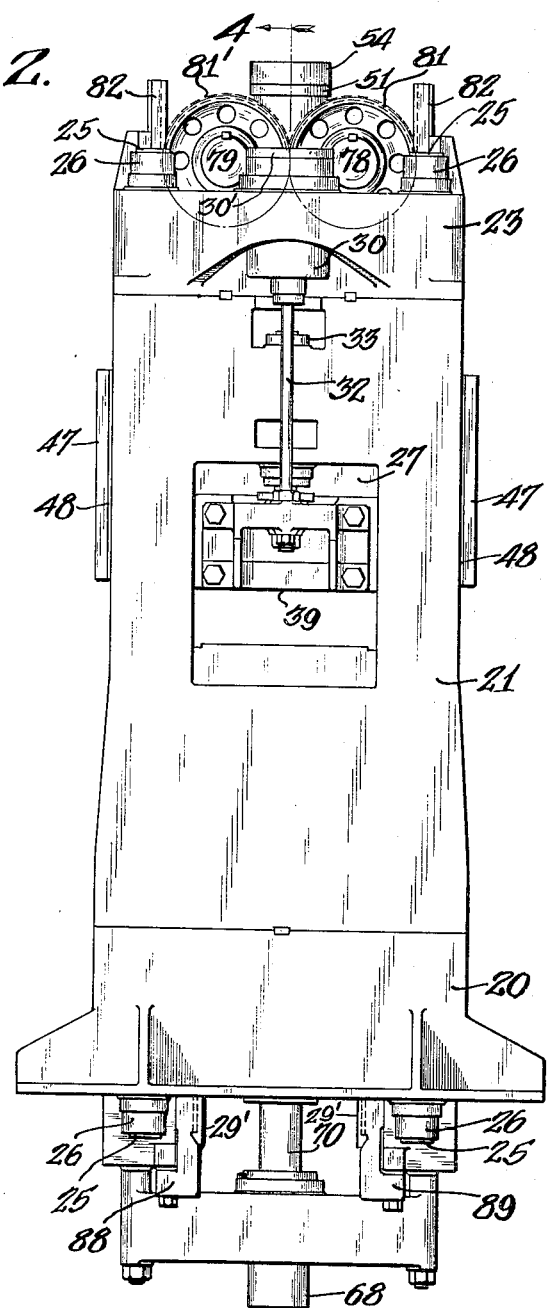
Figure 2 is an end elevation of the structure shown in Figure 1.

The outer slide and its operating and controlling mechanisms are seen in Figures 1–3 but appears best in Figures 4 and 6.

The outer slide 27 is balanced by air cylinders 30 having pistons 31 and supporting rods 32. These are not intended to afford support further than is necessary so that the outer slide floats and can be controlled easily and quickly for movement up or down by the manipulating cylinders 33.

The outer slide is lifted and lowered from and to its work by hydraulic cylinders 33 which have inlet 34 for downward pressure and inlet 35 for lifting pressure and are provided with the usual plungers and stuffing boxes. Besides there are four clamping cylinders 36, distinguished as 36', 36², 36³, 36⁴ which are used to supply and maintain clamping pressure after the outer slide has been applied to the work.

The balancing cylinders 30 for the outer slide and the balancing cylinders 38 for the inner slide are shown in Figure 4. They are effectively similar and operate the same way. They will therefore be described together. They are connected through piston rods 32, 32' with brackets 39 upon the outer slide and with the inner slide at 40, respectively. They are always kept under pressure from a suitable resilient pressure source such as an air receiver or an air or liquid accumulator, causing them to respond to the receiver or accumulator pressure continuously and permitting exhaust to the receiver or accumulator when the parts which they counterbalance are pushed down. They are preferably air supplied because of the greater convenience as a rule and lower cost of handling them as air cylinders, rather than supplying them with oil, for example, under pressure. The fluid inlets are shown at 41 and 42. Dust covers 30' and 38' are shown on the cylinders 30 and 38, respectively.

The cylinders 33, termed operating cylinders, are manipulating cylinders for lifting and lowering the outer slide and its clamping die 43 throughout the range of idle movement, to permit insertion of a blank 44 and subsequently to bring the clamping die into engagement with the blank. They are double acting cylinders applying hydraulic pressure against shoulders 45 to lift their plungers, and hence to lift the outer slide with which they are connected, and applying the hydraulic pressure to the entire cross sectional areas of the plungers at the ends of the plungers 46 to lower. Because of the balanced character of the slide these cylinders need not be large and their size will be determined chiefly by the speed of operation desired and the friction to be overcome.

The outer slide operating and manipulating cylinders just described may be of any suitable character and the form which has been illustrated and thus partially described is selected merely for the purpose of showing an operative structure—as with the rest of the illustration of this case—and not for the purpose of showing any particular structure which must be adhered to.

The sources of supply and control of the hydraulic pressure are shown diagrammatically in Figure 15 and will be discussed later.

The outer slide of course carries dies, clamps or other holding tools corresponding with the needs of the particular job in question. The clamp is shown merely for the purpose of completeness of illustration but without any intention to limit thereby.

Suitable guides 47 (Figures 1 and 10) are supplied, with the character of which guides the present invention has no concern. The wear plate 48 is also shown in Figure 10.

*The inner slide*

The inner slide comprises the upper movable platen which carries upper movable drawing die 49. This upper slide is suitably guided at 50 and is counterbalanced as described above.

The inner slide is lifted and lowered by means of cylinders 51, 52 which are duplicates and in which two pressure surfaces are available for lowering pressure, pushing the piston and die downwardly, and one pressure surface only is supplied on each for lifting the die. The cylinders in themselves are old and are illustrated in detail for completeness of illustration only.

The cylinders 51, 52 comprise outer cylinders within which move main plungers 53. There are also inner plungers 54 which operate within cylinders 55 formed within the main plungers. Hydraulic pressure supply is available to the ends of the inner plungers through passage 56 and to the end of the main plungers by passage 57. Lifting hydraulic pressure is applied against shoulders 58 through inlet 59. The several plungers act as pistons and are suitably packed. The main plungers are rigid with the upper movable platen (the inner slide), giving complete control, resulting in downward movement of the inner slide and of the punch or die carried by it at one total pressure for the dieing work and at an additional pressure for "finishing."

Lifting movement of the parts is effected by pressure upon the shoulders 58 and takes care of the idle upward stroke. It will be noted that in the form of Figure 9 this lifting cannot take place until the outer slide has been lifted and that the idle downward stroke of the inner slide is taken care of by the outer slide which engages the inner slide at 60 (Figure 9) and carries the inner slide downwardly with it. However in the construction shown in Figure 9a there is no engagement between the parts of the two slides and the idle downward stroke of the inner slide must be taken care of ordinarily by gravity or by pressure within the cylinder controlling the inner slide.

By the two sets of balancing cylinders and the three sets of operating cylinders above described all movements of the outer and inner slide with the clamp and die carried by them are effected.

*The draw cushion or third action head*

The lower fixed platen 20 and/or the frame of which it forms a part, supports not only the movable third action lower platen 29 but the operating mechanism by which this platen is moved. The interrelation of the lower fixed platen and the lower movable platen is best shown in Figure 8 in which the fixed platen is shown as having transverse rigid ribs or bars 61 which connect the outer rim fixed platen members 62 and provide spaces 63 between the ribs and between the side webs within which spaces lift and lower cushion slide extensions 64 together providing the upper face of the lower movable platen.

Upon or from extensions 64 are supported whatever mechanism is required for the lower reacting surfaces in the press. The lower fixed platen is ordinarily not used as a wear plate but is lined or covered by a bolster plate 65' which performs this function and through which spacer pins 66 usual operate to support the lower movable die member 67 for whatever purpose. The bolster plate 65 supports the draw table against which the work sheet or blank is clamped.

The cushion slide 29 is guided by guides 29' shown in Figure 11.

The pins 66 are shown as supporting a conventional lower movable platen face or die. From the fact that the lower movable platen is shown in its highest position against the bolster plate it will be evident that this bolster plate affords a convenient stop for the upward movement of the lower movable platen and its die.

The lower movable platen is suitably guided in the frame or in the lower fixed platen—as convenience or division of these terms may decide—and is lifted and permitted to lower or lowered as the case may be by a double acting cylinder having different operating cylinder diameters. This cylinder is shown at 68. The main cylinder is fed with hydraulic pressure at 69 operative upon the face 70' of a hollow plunger 70 within whose cylindrical hollow 71 operates a plunger 72. This plunger is in itself hollow and through its length is fed with hydraulic pressure entering at 73.

It will be noted that the hydraulic pressure upon the lower face 70' of the plunger 70 and that upon the upper face of the plunger 72 both tend to lift the lower movable platen and its die. Pressure is applied to the smaller area for stripping purposes and to the larger area for lifting and cushioning purposes. This larger area can be used for die pressing purposes where it is desirable to put additional pressure in for the purpose of forming a re-entrant space in the bottom of the container or other article being pressed. However, normally the pressure upon the larger area 70', is used to provide a cushion so that the upper die may hold the sheet or form being pressed between it and the lower movable platen and continue to press downwardly while maintaining the pressure and forcing the hydraulic fluid out back to its source. The area 70' may be used also for more difficult stripping operations, and, if the pressure be maintained, will automatically perform this function.

Ordinarily the lifting of the lower movable platen into die contact with the sheet or form which is being operated upon, will be effected by use of the smaller area while filling liquid is drawn into the larger space adjacent the larger area, after which pressure may be applied to this larger area to effect suitable cushioning, building up the pressure to the die operating pressure if that operation be intended.

It will be evident that more than one cylinder may be used to operate the draw cushion or die cushion. In Figure 14 two such cylinders are shown.

The weight of the parts may or may not be sufficient to return the parts to the lowermost position when connection is made between the cylinders and a storage tank, as distinguished from their pressure sources. Even where the weight is sufficient for this purpose and particularly where it is not, it is desirable or necessary to use hydraulic pressure for the purpose of quickening or effecting this movement. Such pressure is applied through inlet 75 into the space 76 outside the main part of the plunger 70, applying the pressure against the shoulder 77, corresponding in character and operation with the return pressure mechanism within cylinders 51, 52.

Equalizing mechanism

All of the cylinders and dies necessary to perform the functions of clamping, pressing, cushioning, providing reentrant bottom space and stripping have now been described. The invention however contemplates refinement of these several operations by ensuring substantial uniformity of horizontal position of all operating parts at the same time, that is, that successive positions of the same face shall be parallel. This has been referred to generally as equalizing mechanism and is effective for each of the three moving parts by structure to be described.

Equalizers for the outer slide

The equalizers for the outer slide are seen best in Figures 1–6. Parallel shafts 78 and 79 are carried upon the top of the upper fixed platen and turn in fixed bearings 80 at opposite ends of this platen. These shafts carry gears 81, 81', 81$^2$, 81$^3$ keyed to opposite ends of the shafts. The gears at the adjoining ends of the shaft intermesh and mesh with racks 82 rigidly attached to spaced parts of the end slide. In the illustration it has been convenient to show these gears and racks as four in number and the positions of the racks as located at the corners of the frame comprising the outer slide. However, it is the intention to have these racks and pinions of sufficient number and located at such positions as best to effect the clamping for the particular type of work for which a machine may be desired, permitting change in this wherever the character of the work requires the change.

The construction shown gives uniform position and uniform movement of the points at which the racks are attached within the limits of the work clearances represented by backlash and by the torsional deflection of the shafts.

The equalizers for the inner slide or upper movable platen

The structure for inner slide equalization is best seen in Figures 1, 4, 5 and 7.

Here again, the racks 83 are rigidly carried by the movable part, in this case the upper movable platen, and the operating parts are carried by the fixed platen. The connecting parts which effect the equalization are of the same character here as in the case of the outer slide and comprise parallel shafts 84 operating in bearings 85 fixed with respect to the fixed platen and splined to intermeshing gears 86, 87, at opposite ends of the shafts, intermeshing with each other and with the racks. The same effect is secured here as in the case of the outer slide, namely, that within the range of the backlash and torsional displacement in the shafts, the racks and therefore the corners of the upper movable platen (inner slide) have uniform movement and arrive at the same height throughout. In the present case the structure is much stiffer than in the case of the outer slide with the result that the shafts and gears can be used to transmit load and thus to tend to equalize the pressure exerted by the upper movable die against what may be different resistance made with the work. There may therefore be equalization of the same character as in the case of the outer slide with additional equalization of load as tending to avoid retardation due to excessive resistance made at one or more points.

The load equalization might be explained as follows: Fastening the racks to different and preferably well spaced points about the perimeter of the inner slide produces an effect of power transmission, i. e., when one corner, for example, tends to lead due to meeting low resistance the reaction from its leading movement tends to tilt the slide in a direction to correct this and transmits power for this purpose from the leading side or corner to the lagging side or corner. For example, where there is a light draw at one side and a deep draw at the other side, the equalizing mechanism redistributes load from the side having the light draw to the side having the deep draw.

*Equalizers for lower movable platen cushion head*

The equalizers for this purpose are of the same general character and function in substantially the same way as those for the inner slide last described in that they equalize both to secure uniformity of motion and position and to transmit pressure to overcome the otherwise disturbing influence of excessive work reaction at another point. They operate, however, in a manner somewhat reverse to that of both of the other equalizers in that instead of the racks 88, 89 travelling with the movable part and the shafts being mounted in bearings fixed with respect to the movement of the parts, the reverse is true and the racks 88 and 89 are stationary with respect to the bed whereas the shafts 90 and 91 have bearing in the movable lower platen or cushion slide.

The shafts 90 and 91 are splined to gears 92, 93 which not only intermesh but mesh respectively with the racks at the several ends. The gears 92 and 93 are shown at one end only of each of the shafts but corresponding gears and corresponding connections with like racks are used at the other ends of the shafts.

It will be evident that the gears and racks maintain corresponding movements and corresponding parallelism of successive positions as in the other equalizers, within the range of play inevitable by reason of backlash and torsional shaft displacement. It will be clear that in this present case also there will be load equalization between points of advanced and points of retarded movement.

Figures 12, 13 and 14 show constructions which are alternative in some particulars to those shown in Figures 6, 7 and 8 respectively. The changes made have been in the balancing mechanisms and in the so-called equalizing mechanisms.

Whereas the balancing in the other figures is by pneumatic or hydraulic pressure constantly tending to lift the counterbalanced parts and having the same resilient lifting effort throughout their ranges of piston movements, in Figures 12, 13 and 14 springs 94, 95 and 96 surrounding tension rods 97, 98, 99 engaging the respective moving parts and cooperating between fixed abutments 100 and tension rod terminals 101, perform the counterweighting function.

The springs 94, 95 and 96 are not the full equivalents of the pneumatic or hydraulic cylinders for the purpose because of the different resistance to compression at different parts of the range of compression. Nevertheless the springs are quite effective and may be made to give sufficient approximation to the lifting effort desired.

The other main difference between the structures of Figures 6, 7 and 8 on the one hand and 12, 13 and 14 on the other lies in different compensations in the two. In Figures 12, 13 and 14 the compensation is effected through shafts 78', 79' carried in bearings 80' for the inner slide, 84' carried in bearings 85' for the outer slide and 90' and 91' for the third action slide, but instead of the gearing connecting these pairs of shafts they are connected by rocker arms 102, 103, 104, 105, 106 and 107 splined to their shafts. Each rocker arm comprises an arm 108 pivotally connected by a link 109 with a block 110 rigid with the movable member and a lever arm 111. The arms 111 are connected within the pairs by links 112 so that the tilting movement of the rocker arms is synchronized within each pair and the points of attachment of the links 109 are maintained in parallel positions throughout the range of movement.

The clamping cylinders for the outer slide, shown at 36 in Figures 9 and 15 are supplied with oil by a slack oil filling system when the outer (clamping) slide is pushed down by the piston of the manipulating cylinder. During this downward movement of the outer slide the rams of these clamping cylinders follow the slide and would create a void but for the supply of filling oil available from tank 113 through suitable piping and valves 114. This filling operation is well known and need not be further described except to say that the same valves are used for exhaust purposes and are controlled for filling or exhaust by the pistons in cylinders 115 controlled by the pull-back pressure from one of the cylinders.

The main pressure through the cylinders 36 is supplied from pump 125 through suitable piping to valve 116. Up to this point the connections are all in parallel. From valve 116 the connections pass through individual piping including individual check valves 117. The individual piping is shown at 118, 118', 118² and 118³ supplying cylinders 36', 36², 36³ and 36⁴ respectively.

The pull-back from either the manipulating cylinder for the outer slide or the pull-back for the main cylinder for the inner slide may be used to open valves 114. However, as illustrated in Figure 15 the connection is shown by pipes 119 controlled by a valve 120 having oil supply through pipe 121 pressure supply to the connection 56 of the cylinder for the inner slide and pull-back connection at 123 connecting at 59 with the same cylinder. This valve shows exhausts at 124 and the exhausts are given this number throughout the valves shown.

There is some advantage in hook-up of the cylinders 116 with the pull back from the main operating cylinder for the inner slide rather than with the pull back for the manipulating cylinder for the outer slide inasmuch as the valve release to be taken care of is the valve release to permit exhaust from the pressure end of the main cylinder for the inner slide. However, the device would still be operative if the connection at 123 were the connection to the pull back for the outer slide.

The main pump for the hydraulic pressure system is shown at 125. It is connected with the tank 113 through pipe 126 and distributes to various hydraulic connections through pipe 127. Four connections are here shown. Pipe 128 leads to the constant pressure side of the stripper entering at 73. The connection to the operating valve for the third action head is shown at 129 and connects through valve 130 at 131, from which valve distribution is made to the pressure side of the third action head cylinder through pipes 132 and 133 entering at 69. Another connection through valve 130 is by way of pipe 134 entering the pull back of this same cylinder at 75. A relief valve is shown at 135 which can be set to release at any pressure and can thus be used to control the pressure within the third action head cylinder, when the third action head is used as a die cushion and when there must therefore be exhaust in some way to take care of the oil driven out when the cushion is pushed downwardly.

At 136 is shown a check valve connected through piping not shown with any suitable source such as a tank 113 so that filling of the third action head main cylinder may take place when the head is raised by the action of the constant pressure within space 71.

The connection from the main pump shown at 137 leads to a valve 138 and thence through piping 139 to the inlet at 34 in the outer slide manipulating cylinders. This supplies the pressure for the upper end of the manipulating cylinder controlling the outer slide. The pipe 140 connects with the pull back of the same manipulating cylinder where the oil enters at 35.

The pipe at 121 (Figure 7) from valve 120 supplies the main pressure for the first power in the drawing cylinders 51 and 52 controlling the inner slide. The connection is made in the drawing through a common pipe 141 dividing and feeding the separate cylinders by pipes 142 and 143 entering at 56. As thus far described the main pressure only would be used. Through a pipe 144 leading to a distributing valve 145 the connections can be set so as to stop the pressure here or to transmit the pressure through the distributing valve, pipe 146 and pipes 147, 148 to the connections 57.

Connected with the pipes 142 and 147 respectively are filling valves 149 and 150, each controlled as in the case of the valves 114 by pull back pressure coincident and preferably from the same cylinder as that in which exhaust must take place. As shown the connection is to the pull back connection 151 of valve 120. This pull back connection is made to a cylinder in each of the valves 149 and 150, the cylinders being of the same kind and functioning in the same manner as the corresponding cylinders for valves 114.

The filling draws through pipes 152 and 153 from any suitable tank such as 113.

The auxiliary pumps and control

If it be not the intention to reduce the pressure in these main clamping slide cylinders at any time during the drawing operation below their initial minimum pressures the connections between these cylinders and the main pump 125 (retaining the check valves) may be maintained constantly throughout the drawing operation. However, if it be the intention to reduce the pressure in any of these cylinders 36 below this initial minimum pressure at any time during the drawing operation it will be necessary to cut off the connection between the pump 125 and the cylinders after the desired minimum starting pressure has been attained. The preferred form cuts off the connection.

The clamp-holding pumps and operating mechanisms

In order that the pressures upon the various main clamping cylinders may be made variable during the stroke or may be varied initially before the stroke has begun, separate adjustable pressure pumps are provided. These as shown are four in number, corresponding to the four cylinders shown and will be different in number if a different number of contact points and the corresponding different number of cylinders be arranged about the perimeter of the holding clamp.

For convenience a main pump has been shown bringing the cylinders up to the minimum initial pressure by parallel connections and protected from regurgitation from one to another of the pumps by the check valves.

In Figure 15 there are shown two pumping units driven by motors 154, 155 connected to drive shafts 156, 157 upon which are mounted the elements of Hele-Shaw type pumps. In the particular illustration shown the inner member 158 carries the cylinders and the outer member 159 carries the pistons. Both revolve. The ring 161 may or may not revolve. Lateral adjustment of the position of the outer member adjusts the eccentricity and therefore adjusts the pumping displacement.

When the ring is adjusted to place the center of the outer member on one side of the shaft, the pump is effective to increase the pressure and when on the opposite side of the shaft center the pump is effective to reduce the pressure. In the illustration as the eccentricity is increased by movement toward the right the pressure is increased. Within the casing 162 is placed a head 163 carrying a cylinder 164 within which operates piston 165. The interior of the cylinder 164 communicates with the main pressure of the system through pipe 166, whereby with shifting of the movable member to the right in Figure 16 the resultant pumping action will increase the pressure and raise the resistance and ultimately bring this movement to a stop and reverse the movement to a point where the eccentricity is nil or small.

When the pump is effective to increase the pressure it is effective also to increase resistance against this shifting movement through the cylinder and piston, so that the reaction pressure cancels out the shift of the laterally movable member and ultimately stops the pumping action while maintaining the pressure at which the reaction wiped out the eccentricity. The pintle 168 may carry the feeding and distributing conduits.

The outer block is held laterally between shoes 169, 170 connected respectively with transmission spring 171 and piston 165.

Assuming that the pressure in the cylinder effective upon the piston 165 exactly balances the pressure communicated through the spring 171 from any source such as button 172 the laterally movable (here outer) block will lie in neutral position. Additional pressure communicated from button 172 through spring 171 will momentarily increase the spring pressure in Figure 16 and will momentarily shift the laterally movable block with the effect that the cylinder blocks will be eccentric to each other and some pumping will take place, sufficient to bring the pressure in the cylinder 164 up to a point at which the laterally movable block will be reversely shifted until the eccentricity has been eliminated and the pump will again reach a non-pumping balance at the new spring pressure and at the new pressure at the discharge side of the pump.

The principle above is utilized to automatically adjust and then maintain the pressure in the clamping cylinders through individual pumps which may be of the same type as that shown in Figure 16 but different from them in size or of different character, provided only that they be effective to vary the pumping pressure available by reason of movement of some operating mechanism such as is shown as working through the button 172. As elsewhere shown the adjustment may be effected by hand or a different pump and connections may be used.

Since each of these pumps is connected to a separate and independent clamping cylinder and the connections from the main pump are or may be cut off at the time that these independent pumps become effective, the independent pumps may be made to determine in the individual cylinders served by them any desired initial pressures or pressures variant with progress of the drawing operation.

Whatever mechanism be used to operate the springs of Figure 16 or other operating mechanism which will perform the function described —of which one other form is shown in Figure 17—it will be evident that the pressures in the individual cylinders may be controlled from the outside by the expedient, as of Figure 16, of merely varying the pressure upon the respective springs. Increase of pressure on the spring will cause an increase of pressure in the discharge from the pump with neutralization of the position of the laterally movable block; likewise reduction of spring pressure will cause pumping in the opposite direction to reduce the pressure on the discharge side with subsequent adjustment and neutralization. Thus the pressures in the individual cylinders $36^1$, $36^2$, $36^3$ and $36^4$ may be increased or reduced, each one entirely independently of the pressure in the others, or in another by further compression or relative release of the spring in the corresponding individual pumping unit. This may be made use of to control the compression of the springs in the several pumping units, initially to determine the starting clamping pressure from each cylinder and by variation of the compression of the individual springs to maintain this initial compression of the springs and therefore the initial pressure in each individual clamping cylinder and progressively to increase or reduce the pressure or to first increase and then reduce or reduce and then increase as may be desired during any operation to which this variation is to be timed. In the illustration the control of the variation has been effected by the position of the inner slide and its die so as to be determined by the extent to which the drawing operation has progressed. It will be evident that the control could be from any other operation or from clock-control. A timed control is shown in connection with an alternative method of variation of the pumping in Figure 17.

In the illustration of Figure 15 the control of pressures in the individual pumps is affected through individual cams 173, 174, 175, 176 on cam shaft 177, mounted in bearings 178.

The cams may be of the same or of different predetermined contour and angular position of mounting upon the shaft to cause the same or any different given pressures by operating faces, the pressures being maintained by dwells during any range limit desired. The cams are shown as of different contour in order to illustrate the fact that any predetermined arrangement of contour may be utilized. The cam 173 has a spiral contour at 179 steadily reducing the pressure in the system with drawing movement of the press. Cam 174 is of general heart shape at 180, reentrant at 181 and with a peak at 182, providing for a reduction of pressure, with the subsequent increase of pressure up to a greater extent than the initial pressure. Cam 175 is provided with three diameters at 183, 184 and 185 with a dwell upon each diameter. The pressures become progressively less with drawing movement of the press. Cam 176 is provided with two diameters 186 and 187, with shoulders 188 between, the initial diameter being the larger, whereby after an initial dwell the pressure is reduced to that corresponding to the smaller diameter. Any of the cam surfaces shown as dwells can of course be utilized as increasing or decreasing diameters if desired.

The connections by which the drawing operation is effective to vary the pressures in the individual pumps through operation of the cam surface and its cams are shown in Figure 15. A rack 189 movable with the inner slide and its die engages a gear 190 upon the cam shaft 177 and the motion of the cams is transmitted to the buttons 172 through rocker arms 191 carried by mounts 192. The end 193 of the rocker arm engages the button and a roller 194 upon the rocker arm end 195 engages the cam.

The connections from the several individual pumps to the supply tank 113 are shown at 196 and the outlet or discharge connections from the pumps to their respective cylinders are shown at 197, 198, 199 and 200.

In Figure 17 an alternative construction is shown whereby the pressure available for the individual pumps may be maintained or varied. This is effective as in the construction of Figure 16 to supply the several clamping pressures to their respective cylinders and to vary them separately or together. In Figure 17 a pump is shown at 201. This draws from a tank such as 113 at 202 and has a discharge outlet at 203. The discharge outlet leads to the individual cylinders with which connection is made at 204 and the pressure is controlled by an adjustable relief valve 205 which is controlled by a spring 206 and in which the spring pressure is varied in a manner similar to that shown in Figure 16, namely, by a connection such as a button 172 engaged through a rocker arm. The pressure is increased or decreased through a cam. There is this variation from Figure 16 however in that the cam is driven continuously from any suitable motor 207 which may be a spring motor such as a clock, or may be driven or controlled in any other manner. In the structure of Figure 16 the cams could be motor driven and in that of Figure 17 the cam could be controlled by the rate of drawing.

In Figure 16a hand operation of the control of pressure in the individual holding cylinders for the outer or clamping slide is indicated. There is shown a hand wheel 208 connected with a stud shaft 209 carrying a thread 210 engaged within a sleeve 211 so that the stud shaft is advanced to bring the disc 212 into variant compressing engagement with a spring such as the spring shown in Figure 16 or Figure 17. A ball bearing 213 is shown to relieve friction.

Various other mechanisms might be designed to vary the individual pressures at different points of the perimeter of the clamping slide, and all such mechanisms embody the processes herein disclosed.

*In operation*

At the start the outer (clamping) slide is up, having been lifted by the pull-back operation of the manipulating cylinders. A blank is then inserted and is rested on the draw-table, the inside of which forms an outer lower fixed die. The manipulating cylinders are now supplied with oil from the main pump. They carry the outer (clamping) slide down through its idle stroke into contact with the blank. Its clamping effect is so small that it makes little difference whether it remain on or not.

The main cylinders (four in number as illustrated) now come into effective operation. They have been filling meantime but now are brought up to minimal pressure by oil from the main pump, all four in the present instance receiving pressure in parallel from the same pump. Regurgitation is prevented by suitable check valves so that the pressure in these cylinders cannot be reduced by backward flow to each other or to the main pump.

When the pressure from the main pump and from the individual pumps (which are connected to their cylinders at all times) has come up to the pressure desired as the lowest initial pressure to be applied at any one of the four points about the perimeter of the clamp, the connection from the main pump is cut off. During the remainder of the drawing operation the main pump is used if at all for other purposes.

Continuing the cycle, the individual pumps may now, according to the control exercised by their cams, continue to increase the pressure in the individual cylinders served by them up to the pre-set pressure at which the clamp is to operate initially at the point about the perimeter controlled by this or these cylinders. The pressures on the clamp are now the predetermined pressures for the start of the draw and these pressures may be the same about the perimeter or may be suitably different, any one from any of the others. The drawing operation is controlled by the inner slide and the cushioning slide then proceeds with no change in the pressure at the different points about the outer slide except as this pressure is altered in response to the movement of the inner (drawing die) slide. On the other hand, if it be desired to alter the pressure at any point or points, either to increase or to reduce this pressure, this is accomplished by hand (Figure 16a) or by alteration of the face of the cam in engagement with the nose or other operating mechanism by which the variation in the face of the cam is transmitted into variation in pump pressure. The pressure on the spring will be determined by the position of the face of the cam and with each outward extension of the cam face there will be an increase of compression of the spring with a momentary shifting of the movable pump element which will continue until the pressure has built up to a point at which the movable pump element is pushed back to approximately neutral position and at which the increased pressure on the spring will be maintained until there is a corresponding withdrawal of the cam with consequent reduction in spring pressure and in fluid pressure.

When the outer clamping slide moves down it carries the inner slide down with it, in the preferred form. During this operation the two pressure cylinders operating the inner slide are "slack filled" as the inner slide is moved down.

Pressure is then applied to one or both of the pressure areas of its cylinder. The lighter pressure is ordinarily used for light drawing with the heavier pressure for finishing and setting the metal drawn.

During the downward power movement of the inner slide the connection between the inner slide and the individual pumps causes or may as desired cause differences in clamping pressures about the circumference of the clamps. These continue with corresponding tightening, maintenance, or reduction in the pressures and consequent corresponding lessened, maintained or greater permissible creeping of the blank.

The equalizing or load distributing benefits from my invention are quite useful in connection with the third action slide whether its action be cutting or stripping, cushioning or independent drawing within the contour of the draw produced by the inner slide. Where it is used for its cushioning function only, not alone the equalizing and pressure distributing functions but the quick drop function of the invention are applicable.

With the third action slide in substantial engagement with the blank at the start its cushioning effect is a reaction effect, holding the blank between itself and the inner slide during the drawing movement. In this function it prevents the droop of the draw and maintains the intended shape of the bottom of the draw. It also controls the creeping of the blank against the face of the die upon the inner slide and may be used to vary the pressure against the die at different points.

When creeping of the blank against the face of the die is wholly prevented all of the stretch of the drawing operation must come from that portion of the blank between the outer face of the operating die and the edge of the blank; i. e. from the portion lying between the edge of the die and the clamp plus whatever creeping the clamp allows over the area held by it. The area of the blank stretched normally includes also a portion of the blank between the lower end of the operating die and the cushion which creeps even when the cushion is in place but which is allowed to be stretched much more when the cushion has been downwardly backed off from its operating engagement with the blank.

At any time that the third action die is to be lowered whether at the end of the operation or when the operation has been partly performed and it is desired to free the blank from the cushioning pressure and allow the inner slide die to follow through, the lowering is effected hydraulically, giving a great deal more responsive control over the third action slide than if gravity were relied upon alone for the lowering function.

My invention makes possible accomplishment of complicated drawing operations with accurate adjustment of the amount of creep throughout the drawing cycle and variantly at different parts of the drawing cycle and at different parts of the periphery of the blank at any given part of the drawing cycle. This variation can be up or down or the pressure can be maintained as desired. The designer is thus given complete control over the entire operation. He can not only select variant pressures about the clamping perimeter but can predetermine variations in these pressures individually or can vary them all alike.

The control of the pressures can be effected by either of different kinds of mechanisms proposed or can be determined at will and applied by hand.

It will be evident that there is an interrelation between the load-adjusting equalization of the cushions of the press parts and the control of the creeping since uniformity of movement of the inner slide and third action slide reduces the necessity for excessive variation in the creeping by avoiding irregular pulling of the material and permits more exact treatment of the creeping to humor it.

It will be evident that the valve 116 makes it possible completely to shut off the main pump from the cylinders 36 which it otherwise feeds in parallel and that when this valve is opened the individual check valve 117 functions to stop regurgitation.

It will be evident that the main pump has utility in quickly bringing up the pressure but that if it be desired not to use the main pump the individual pumps can be used for this purpose being preferably made much larger in this event than if they are to vary pressure only.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In a hydraulic press, a frame, a draw table on the frame, an outer clamping slide cooperating with the draw table for holding the edge of a generally flat blank to be operated upon, fluid means for balancing the outer clamping slide, hydraulic cylinder means for lifting and lowering the outer clamping slide, hydraulic cylinder means for pressing the outer clamping slide at a plurality of different points about its perimeter, means operatively connected to the press for adjustably controlling the hydraulic pressure applied to said last cylinder means so as to adjustably vary the pressure within the cylinders and within one cylinder or group of cylinders as regards another cylinder or group of cylinders, interlocking equalizing gear means for maintaining the plurality of points of the outer clamping slide with which the equalizing means is connected in substantially the same relative position with respect to the horizontal, an inner slide adapted to distort the blank from its previous contour, and a die cooperating with the inner slide for the deformation of the work.

2. In a hydraulic press, a frame, a draw table on the frame, an outer clamping slide cooperating with the draw table for holding the edge of a generally flat blank to be operated upon, fluid means for balancing the outer clamping slide, hydraulic cylinder means for lifting and lowering the outer clamping slide, hydraulic cylinder means for pressing the outer clamping slide at a plurality of different points about its perimeter, means operatively connected to the press for adjustably varying the hydraulic pressure applied to said last cylinder means so as to vary the pressure within the cylinders and within one cylinder or group of cylinders as regards another cylinder or group of cylinders, interlocking equalizing lever means for maintaining the plurality of points of the outer clamping slide with which the equalizing means is connected in substantially the same relative position with respect to the horizontal, an inner slide adapted to distort the blank and a die cooperating with the inner slide for the deformation of the work.

3. In a hydraulic press, a frame, a draw table on the frame, an outer clamping slide cooperating with the draw table for holding the edge of a generally flat blank to be operated upon, an inner slide adapted to distort the blank from its previous contour, hydraulic cylinder means for lifting and lowering the outer clamping slide, hydraulic cylinders for pressing the outer clamping slide, located at a plurality of different points about its perimeter, means capable of variation as to the pressures in the individual cylinders for applying pressure within the hydraulic cylinders just referred to, means set in operation by the movement of the inner slide adapted to vary the pressures from the individual cylinders on the outer clamping slide, interlocking equalizing means for maintaining a plurality of points of the inner slide with which the equalizing means is connected in substantially the same relative position with respect to the horizontal and a die cooperating with the inner slide for the deformation of the work.

4. In a hydraulic press, a frame, a draw table on the frame, an outer clamping slide cooperating with the draw table for holding the edge of a generally flat blank to be operated upon, means for balancing the outer clamping slide, hydraulic cylinder means for lifting and lowering the outer clamping slide, hydraulic cylinder means for pressing the outer clamping slide at a plurality of different points about its perimeter, means for varying the hydraulic pressure applied to said last cylinder means so as to vary the pressure within the cylinders and within one cylinder or group of cylinders as regards another cylinder or group of cylinders, interlocking equalizing means for maintaining the plurality of points of the outer clamping slide with which the equalizing means is connected in substantially the same relative position with respect to the horizontal, an inner slide adapted to distort the work from its previous contour, hydraulic means for operating the inner slide, interlocking equalizing means for maintaining a plurality of points on the inner slide with which the equalizing means is connected in substantially the same relative position with respect to the horizontal and a draw cushion cooperating with the inner slide for deformation of the blank.

5. In a hydraulic press, a frame, a draw table on the frame, an outer clamping slide cooperating with the draw table for holding the edge of a generally flat blank to be operated upon, means for balancing the outer clamping slide, hydraulic cylinder means for lifting and lowering the outer clamping slide, hydraulic cylinder means for pressing the outer clamping slide at a plurality of different points about its perimeter, means for varying the hydraulic pressure applied to said last cylinder means so as to vary the pressure within the cylinders and within one cylinder or group of cylinders as regards another cylinder or group of cylinders, interlocking equalizing means for maintaining the plurality of points of the outer clamping slide with which the equalizing means is connected in substantially the same relative position with respect to the horizontal, an inner slide adapted to distort the blank from its previous contour, a draw cushion cooperating with the inner side for the deformation of the work, means for maintaining resilient supporting pressure upon the draw cushion and equalizing means for maintaining a plurality of points on the draw cushion with which the equalizing means is connected in substantially the same relative position with respect to the horizontal.

6. In a hydraulic press, a frame, a draw table on the frame, an outer clamping slide cooperating with the draw table for holding the edge of a generally flat blank to be operated upon, an inner slide adapted to distort the blank from its previous contour, hydraulic cylinder means for lifting and lowering the outer clamping slide, hydraulic cylinders for pressing the outer clamping slide at a plurality of different points about its perimeter, means capable of variation as to the pressures in the individual cylinders for applying pressure within the hydraulic cylinders just referred to, means set in operation by the movement of the inner slide adapted to vary the pressure from the individual cylinders on the outer clamping side, interlocking equalizing means for maintaining a plurality of points of the inner slide with which the equalizing means is connected in substantially the same relative position with respect to the horizontal, a movable draw cushion cooperating with the inner slide for the deformation of the work and interlocking equalizing means for maintaining a plurality of points of the draw cushion with which the equalizing means is connected in substantially the same relative position with respect to the horizontal.

7. In a hydraulic press, a frame, an outer slide, guides for the outer slide, resilient balancing means for supporting the outer slide, hydraulic operating means for lifting the outer slide and for lowering the outer slide to clamp against the blank, an inner slide, resilient balancing means for supporting the inner slide, hydraulic lifting and lowering means for the inner slide adapted to lift it from and to lower it against the blank, hydraulic operating means for forcing the inner slide against the blank to distort the blank laterally with respect to the outer slide, a draw cushion, hydraulic means for giving it cushioning effect for the inner slide and interconnecting lever means for equalizing the movements of a plurality of points about the perimeter of the outer slide.

8. A hydraulic press comprising a frame, a draw table supported by the frame, an outer clamping slide movable toward and away from the draw table, a plurality of operating cylinders for the outer clamping slide, each applying pressure to the outer clamping slide at a different point about its periphery, mechanical connection between different points about the periphery of the outer clamping slide, whereby these points are maintained substantially in horizontal alinement, an inner slide adapted to distort the blank engaged between the outer clamping slide and the draw table, mechanical connection between different points on the inner slide, whereby these points are maintained substantially in horizontal alinement and load is readjusted from one point to another, and a draw cushion adapted to cooperate with the inner slide in the distortion of the blank.

9. In a hydraulic press, a frame, an outer slide, guides for the outer slide, resilient balancing means for supporting the outer slide, hydraulic operating means for lifting the outer slide and for lowering the outer slide to clamp against the blank, an inner slide, resilient balancing means for supporting the inner slide, hydraulic lifting and lowering means for the inner slide adapted to lift it from and to lower it against the blank, hydraulic operating means for forcing the inner slide against the blank to distort the blank laterally with respect to the outer slide, a draw cushion, hydraulic means for giving it cushioning effect for the inner slide and intermeshing gear means for equalizing the movements of a plurality of points about the perimeter of the outer slide and inner slide independently.

10. In a hydraulic press, a frame, an outer slide, guides for the outer slide, resilient balancing means for supporting the outer slide, hydraulic operating means for lifting the outer slide and for lowering the outer slide to clamp against the blank, an inner slide, resilient balancing means for supporting the inner slide, hydraulic lifting and lowering means for the inner slide adapted to lift it from and to lower it against the blank, hydraulic operating means for forcing the inner slide against the blank to distort the blank laterally with respect to the outer slide, a draw cushion, hydraulic means for giving it cushioning effect for the inner slide and intermeshing gear means for equalizing the movements of a plurality of points about the perimeter of the outer slide and the draw cushion.

11. In a hydraulic press, a frame, an outer slide, guides for the outer slide, resilient balancing means for supporting the outer slide, hydraulic operating means for lifting the outer slide and for lowering the outer slide to clamp against the blank, an inner slide, resilient balancing means for the inner slide, hydraulic lifting and lowering means for the inner slide adapted to lift it from and to lower it against the blank, hydraulic operating means for forcing the inner slide against the blank to distort the blank laterally with respect to the outer slide, a lower draw cushion, hydraulic means for giving it cushioning effect for the inner slide and intermeshing gear means for equalizing the movements of a plurality of points about the circumference of the inner slide and draw cushion.

12. In a drawing press, a frame, a stationary draw table, a yieldably supported draw cushion within the draw table, an outer clamping slide cooperating with the draw table, an inner slide cooperating with the draw cushion, hydraulic means for applying load to the inner slide and for hydraulically adjusting the clamping distribution during downward drawing movement, interconnected levers connecting the frame and the two sides of the inner slide, levelling the inner slide and correcting any maladjustment of load by redistribution of load from one side to the other side of the inner slide, hydraulic means for upwardly pressing the draw cushion, means for maintaining the cushion level and interconnected levers connecting the frame and the two sides of the draw cushion, levelling the draw cushion and correcting any maldistribution of pressure by redistribution of pressure from one side to the other side of the draw cushion.

13. A drawing press including a draw table, cooperating dies and a clamping slide holding the blank against the draw table, in combination with a plurality of hydraulic cylinders distributed around the periphery of the clamping slide, a source of hydraulic pressure, a connection therefrom to each of the said cylinders and adjustable pump mechanism in each connection for adjustably boosting the pressures transmitted to the respective cylinders.

14. A drawing press including a draw table, cooperating dies and a clamping slide holding the blank against the draw table, in combination with a plurality of hydraulic cylinders distributed around the periphery of the clamping slide, means for first filling the cylinders with slack oil, means for applying pressure to all of said cylinders from a common source at a common pressure not greater than the initial pressure of the cylinder having the lowest initial pressure and means individual to the cylinders for boosting the pressures in the cylinders to the initial pressures.

15. A drawing press including a draw table, cooperating dies and a clamping slide holding the blank against the draw table, in combination with a plurality of hydraulic cylinders distributed around the periphery of the clamping slide, quick-acting means for moving the slide into clamping position, means for applying pressure to all of said cylinders from a common source at a common pressure not greater than the initial pressure of the cylinder having the lowest initial pressure and means individual to the cylinders for boosting the pressures in the cylinders to the predetermined pressures for those cylinders at the beginning of the draw.

16. A drawing press including a draw table, a clamping slide cooperating with the draw table, and movable operating dies, in combination with a plurality of hydraulic cylinders peripherally distributed about the clamping slide, pumps, one for each hydraulic cylinder, maintaining pressures individual to the different cylinders, means for varying the pressures delivered by the individual pumps at different rates and common means for synchronizing the means for varying the pressures with the draw.

17. A drawing press including a draw table, a clamping slide cooperating with the draw table, and movable operating dies, in combination with a plurality of hydraulic cylinders peripherally distributed about the clamping slide, means for slack filling the hydraulic cylinders and pumps, one for each hydraulic cylinder, maintaining pressures individual to the different cylinders, pressure adjustment mechanism individual to each pump and common means for operating the pressure adjustment mechanisms for all of the pumps in response to movement of one of the dies.

18. In the art of drawing a metal blank, using a clamp and cooperating die and cushion, the process which consists in clamping the blank, in deforming the blank by advancing the die against the cushion and in subsequently withdrawing the cushion during the remainder of the drawing stroke of the die by moving the cushion more rapidly than the die.

19. In the art of drawing a metal blank, the process which consists in hydraulically clamping the work at different points about its perimeter, in working the metal against a draw cushion, in altering the hydraulic pressure progressively at the several points during the working of the metal and in continuing the working while removing the draw cushion from contact with the blank.

20. In a power press, holding and die pressing mechanisms adapted to hold and laterally deflect a blank, an upwardly pressing cushion adapted to act resiliently against the blank during the dieing operation, hydraulic means for resiliently pressing the cushion upwardly and hydraulic means for dropping the cushion quickly when it has performed its dieing function while the blank is being further deformed by the die pressing mechanism.

21. In a drawing press, clamping means for the blank, relatively cooperating operating die and drawing cushion means for applying pressure to the operating die for the entire drawing stroke, means for pressing the cushion yieldingly against the blank during a part of the operating stroke to apply cushioning pressure to the operating die and means for withdrawing the cushion from resistance to movement of the operating die during the remainder of the operating drawing stroke.

22. The method of drawing a metal blank into a desired shape and size by the relative movement of two dies, which comprises clamping said blank against one of said dies with a fluid pressure, moving the other of said dies against said clamped blank to deform and draw the clamped blank into the desired shape and size, and automatically decreasing and increasing the delivery of the clamping fluid in response to successive positions of the moving die during the drawing operation for decreasing and increasing the clamping pressure on said blank, in correlation to successive relative positions of said dies while in contact with said blank during a drawing operation.

23. The method of drawing a metal blank into a desired shape and size by the relative movement of two dies, which comprises clamping said blank against one of said dies with fluid pressure, drawing said clamped blank to the desired size and shape by relative movement of said dies, and varying the delivery of clamping fluid during said drawing movement in correlated relation to the successive relative positions of said dies during their drawing movement, whereby tearing of the blank during the drawing movement will be substantially prevented.

24. In a drawing press, a fixed die holding element, a platen mounted for movement toward and from said element, means for actuating said platen toward and from said element, a blank holding member also movable toward and from said element, means including a fluid circuit and a variable delivery pump of the type operable to set itself automatically in approximately neutral delivery condition whenever a predetermined pressure on its delivery side is reached, and adjustable to vary the pressure at which it sets itself to neutral delivery condition, for moving said holding member in both directions and also for holding it under pressure against said element, and means moving with said platen for adjusting said pump in a manner to vary the pressure at which it will set itself for neutral delivery position in a predetermined sequence of pressures having a definite predetermined relation to successive positions of said platen in its travel toward said element.

25. In a drawing press, a fixed die holding element, a platen mounted for movement toward and from said element, means for actuating said platen toward and from said element, a blank holding member also movable toward and from said element, means including a fluid circuit and a variable delivery pump of the type operable to set itself automatically in approximately neutral delivery condition whenever a predetermined pressure on its delivery side is reached, and adjustable to vary the pressure at which it sets itself to neutral delivery condition, for moving said holding member in both directions and also for holding it under pressure against said element, and a cam device actuated by said platen during its travel toward said element for adjusting said pump and varying the pressure at which it sets itself into approximately neutral delivery position automatically in a predetermined sequence of different pressures during the travel of the platen toward said element.

26. In a drawing press, a relatively fixed die holding element, a platen mounted for movement toward and from said element, means for actuating said platen toward and from said element, a member for holding a blank against said element, fluid actuated means for exerting a holding pressure on said member in a direction to clamp a blank to said fixed element, and pressure responsive means responsive to the travel of said platen toward said element for varying the fluid pressure of said fluid actuated means on said member in accordance with different successive positions of said platen during its said travel toward said fixed element.

27. In a drawing press, a fixed die holding element, a platen mounted for movement toward and from said element, means for actuating said platen toward and from said element, a blank holding member also movable toward and from said element, means for moving said member, means including a fluid circuit and a variable delivery pump of the type operable to set itself automatically in approximately neutral delivery condition whenever a predetermined pressure on its delivery side is reached, and adjustable to vary the pressure at which it sets itself to neutral delivery condition, effective while the blank holding member is moved toward said element, for holding the blank under pressure against said element, and a cam device actuated by said platen during its travel toward said element for adjusting said pump and varying the pressure at which it sets itself into approximately neutral delivery position automatically in a predetermined sequence of different pressures during the travel of the platen toward said element.

28. In a drawing press, a fixed die holding element, a platen mounted for movement toward and from said element, means for actuating said platen toward and from said element, a blank holding member also movable toward and from said element, means for moving said member, means for applying and varying pressure upon the blank including a fluid pressure circuit and a variable delivery pump served by it and of the type operable to set itself automatically in approximately neutral delivery condition whenever a predetermined pressure on its delivery side is reached, and adjustable to vary the pressure at which it sets itself to neutral delivery condition, effective while the blank holding member is moved toward said element, for holding the blank under pressure against said element, and rotary cam means turning with vertical movement of said platen during its travel toward said element for adjusting said pump and varying the pressure at which it sets itself into approximately neutral delivery position automatically in a predetermined sequence of different pressures during the travel of the platen toward said element.

29. A drawing press comprising a draw table, a clamping slide cooperating with the draw table to grip the blank, an inner slide and a draw cushion cooperating within the clamping slide and draw table, hydraulic means for advancing the inner slide, means for relatively altering the clamping pressure upon different parts of the blank during the drawing operation, and hydraulic means for applying cushioning pressure to the draw cushion in combination with means, applied after the cushion has performed its function, for moving the draw cushion away from the inner slide during the further advance of the inner slide and at a rate more rapid than the rate of advance of the inner slide.

HENRI P. L. LAUSSUCQ.